(12) United States Patent
Krause et al.

(10) Patent No.: US 7,210,551 B2
(45) Date of Patent: May 1, 2007

(54) METHOD FOR OPERATING A LEVEL CONTROL SYSTEM OF A MOTOR VEHICLE

(75) Inventors: Michael Krause, Schwülper (DE); Werner Schünemann, Winsen (DE); Harald Schaumburg, Sarstedt (DE)

(73) Assignee: Continental Aktiengesellschaft, Hannover (DE)

( * ) Notice: Subject to any disclaimer, the term of this patent is extended or adjusted under 35 U.S.C. 154(b) by 459 days.

(21) Appl. No.: 10/821,978

(22) Filed: Apr. 12, 2004

(65) Prior Publication Data

US 2004/0236486 A1 Nov. 25, 2004

(30) Foreign Application Priority Data

Apr. 10, 2003 (DE) ................ 103 16 760

(51) Int. Cl.
*B60G 17/06* (2006.01)
*B60G 17/019* (2006.01)

(52) U.S. Cl. ............ 180/282; 701/38; 280/5.502; 280/6.154; 280/5.503; 280/5.51; 280/6.157; 340/440

(58) Field of Classification Search ............ 701/37–40; 280/5.501, 5.502, 6.154, 6.155, 5.503, 5.51, 280/6.16, 6.157–6.159; 180/282, 41; 340/440
See application file for complete search history.

(56) References Cited

U.S. PATENT DOCUMENTS

| | | | |
|---|---|---|---|
| 3,404,898 A | | 10/1968 | Vogel |
| 4,718,695 A | * | 1/1988 | Kawagoe ............ 280/6.157 |
| 4,803,630 A | * | 2/1989 | Takizawa et al. ............ 701/39 |
| 4,965,878 A | * | 10/1990 | Yamagiwa et al. ........... 701/37 |
| 6,234,493 B1 | | 5/2001 | Kleen et al. |
| 6,240,348 B1 | * | 5/2001 | Shono et al. ................. 701/37 |
| 2002/0079626 A1 | | 6/2002 | Grotendorst et al. |

FOREIGN PATENT DOCUMENTS

| | | |
|---|---|---|
| DE | 40 03 766 | 8/1991 |
| DE | 42 17 247 | 10/1992 |
| DE | 100 22 834 | 11/2001 |
| EP | 0 689 116 | 12/1995 |
| EP | 0 752 329 | 1/1997 |
| EP | 0 808 732 | 11/1997 |
| EP | 1 153 773 | 11/2001 |
| FR | 2 630 684 | 11/1989 |
| JP | 58-49507 | 3/1983 |

* cited by examiner

*Primary Examiner*—Ruth Ilan

(57) ABSTRACT

The invention is directed to a method for operating a level control system of a motor vehicle which includes: a control apparatus, sensors for the direct or indirect determination of the distance of the vehicle chassis to the axles of the vehicle wheels; and, actuators for adjusting the distance of the vehicle chassis to these wheel axles. In the method, the control apparatus checks in a desired-actual comparison based on determined measured values whether the inclination of the vehicle chassis exceeds predetermined limit values. When these limit values are exceeded, one or several of the actuators are actuated in order to obtain a level compensation in the sense of a horizontal alignment of the vehicle chassis. To avoid a turnover of the vehicle (1) in an operating situation on a slope (2), the level compensating control activity is prevented by the control apparatus when the vehicle (1) is disposed in a slope and slant position (angles α, β) which is impermissible for vehicle safety.

11 Claims, 7 Drawing Sheets

Fig. 8
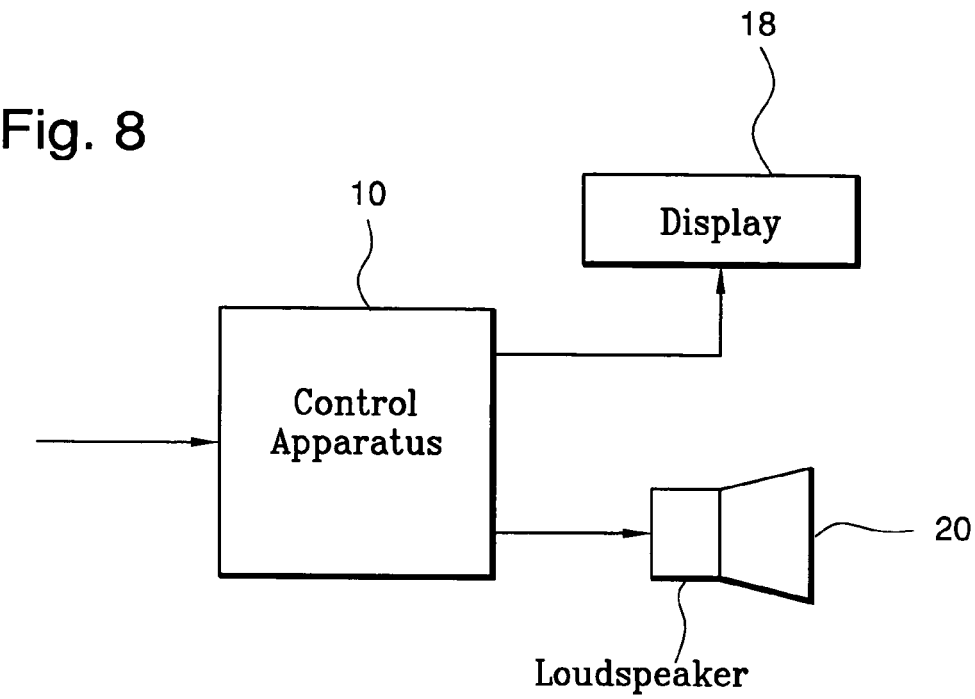
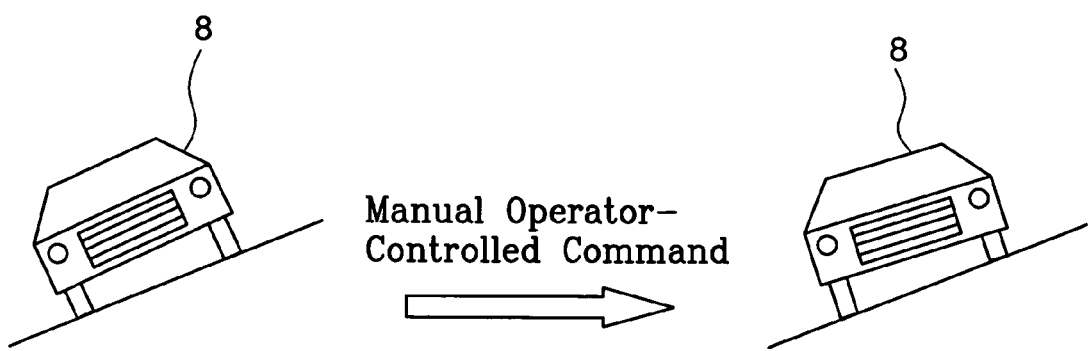
Fig. 9

METHOD FOR OPERATING A LEVEL CONTROL SYSTEM OF A MOTOR VEHICLE

CROSS REFERENCE TO RELATED APPLICATION

This application claims priority of German patent application No. 103 16 760.9, filed Apr. 10, 2003, the entire content of which is incorporated herein by reference.

BACKGROUND OF THE INVENTION

Level control systems appear in ever greater degrees of distribution in motor vehicles because these systems make possible a dip compensation of the vehicle chassis relative to the vehicle body, for example, during rapid acceleration operations or for a non-uniform loading state of the vehicle.

These systems include usually a control apparatus which is connected via sensor lines to sensors for the direct or indirect determination of a distance of the vehicle chassis or vehicle frame relative to the vehicle axles and is connected to actuators via signal lines. With the aid of these actuators, the distance of the vehicle chassis relative to the wheel axis is adjustable in a targeted manner. The sensors are, as a rule, configured as displacement sensors; whereas, the actuators are hydraulically or pneumatically actuable piston-cylinder arrangements or air springs. Furthermore, a hydraulic or pneumatic pump belongs to such a system as do electric switching valves as well as a pressure medium store as may be required. A level control system of this kind is disclosed, for example, in United States patent publication 2002/0079626.

A so-called vehicle slant state is present for an alignment of the vehicle chassis to the particular vehicle axle with this alignment being transverse to the vehicle longitudinal axis. One such operating situation can, for example, be given in that the wheels of the right vehicle side stand on a curb stone while the opposite-lying wheels lie somewhat deeper on the roadway. U.S. Pat. No. 6,234,493 and European patent publication 0,752,329 describe the operation of level control systems in a situation wherein the vehicle slant state is, for example, only controlled out in the sense of a chassis alignment as horizontal as possible when the vehicle, after a vehicle loading operation, is driven down from the curb-stone or when previously determined slant state limit values are exceeded.

Furthermore, German patent publication 100 22 834 discloses a method for preventing the turnover of an air-spring suspended vehicle on an inclined roadway. The operating situation described there is comparable to the above-mentioned curb stone situation. Accordingly, this publication relates to a vehicle having a level control system which is effective in a special manner when a vehicle having a high-lying center of gravity (that is, for example, a high-built commercial vehicle such as a bus) stands or travels with its longitudinal axis transverse to a slope.

In the method described in German patent publication 100 22 834, a turnover of the vehicle for a possible shift of weight within the tourist bus because of traveling guests is prevented in that all air springs of the vehicle are vented after the occurrence of specific control preconditions. According to this publication, in such a dangerous situation, however, it can also occur that only the higher-lying air springs on one side are vented and/or the lower-lying air springs on the other side are filled.

Finally, German patent publication 4,003,766 discloses a level control system for an air spring suspended vehicle wherein the level control operation is prevented in a select-able time span in such operating situations when the speed, with which a wheel axle of the vehicle moves relative to the vehicle frame, exceeds a pregiven threshold value. With this method, all those dynamic spring deflection operations with respect to the response of the level control system can be neglected which are generated by normal driving dynamic operations such as speed changes, travel in a curve, driving through potholes, et cetera.

In addition to the described slant state, there is especially in the operation of off-road vehicles an operating situation wherein the vehicle is not directed with its longitudinal axis precisely uphill or downhill, rather, where the longitudinal axis is aligned slanted to the hill. If such an off-road vehicle is equipped with a conventional level control system, the danger is present when exceeding a specific hill slope inclination angle and slant state angle that the vehicle assumes an unstable position with the level compensation unit and turns over.

SUMMARY OF THE INVENTION

In view of the foregoing, it is an object of the invention to provide a method for operating a level control system wherein the described dangerous situation can be avoided or at least eliminated.

According to the above, the method relates to the operation of a level control system of a motor vehicle having: a control apparatus; sensors for the direct or indirect determination of the distance between the vehicle chassis or the axles or the contact points of the vehicle wheels; and, actuators such as piston-cylinder arrangements or air springs for adjusting the distance of the vehicle chassis to the wheel axles or wheel contact points. In this control apparatus, a check is made on the basis of the determined distance measuring values in a desired-actual comparison as to whether the distances of the vehicle chassis to the particular wheel axles exceed predetermined limit values. With such an exceeding of the limit values, one or several of the actuators are actuated in order to achieve a level compensation in the sense of an alignment of the vehicle chassis as horizontally as possible.

For avoiding or at least for eliminating the so-called dangerous situation, the control apparatus prevents the automatic level compensating control or offers the possibility of a slope compensation limited by the control unit or the vehicle construction (slope stabilization) when the vehicle is disposed in a slope position and slant position impermissible for the vehicle safety.

For detecting the slope position and slant position of the vehicle (that is, especially the slope angle and the slant state angle), sensor data as to speed (preferably measured with the aid of at least one rpm sensor at at least one vehicle wheel) as well as the longitudinal acceleration and the transverse acceleration of the vehicle are utilized. In modern vehicles, these measured values are, as a rule, already detected for the control (open loop and closed loop) of other vehicle functions and are therefore, as a rule, available without additional cost.

BRIEF DESCRIPTION OF THE DRAWINGS

The invention will now be described with reference to the drawings wherein:

FIG. 8 is a schematic showing the control apparatus and a display and loudspeaker connected thereto;

FIG. 9 is a schematic showing the effect of a manually triggered actuation of actuators of the vehicle level control system;

DESCRIPTION OF THE PREFERRED
EMBODIMENTS OF THE INVENTION

Figure 1:
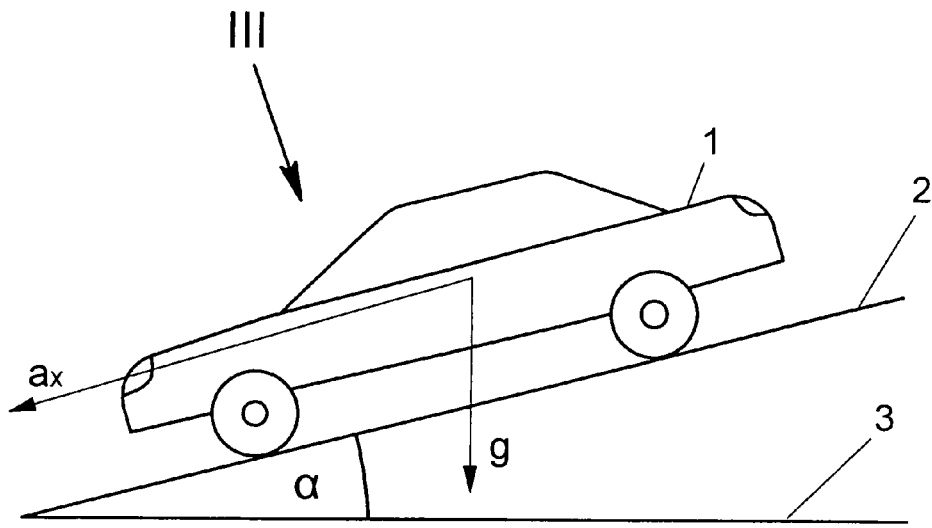
FIG. 1 is a schematic showing the motor vehicle in a downhill direction of its longitudinal axis.
Figure 2:
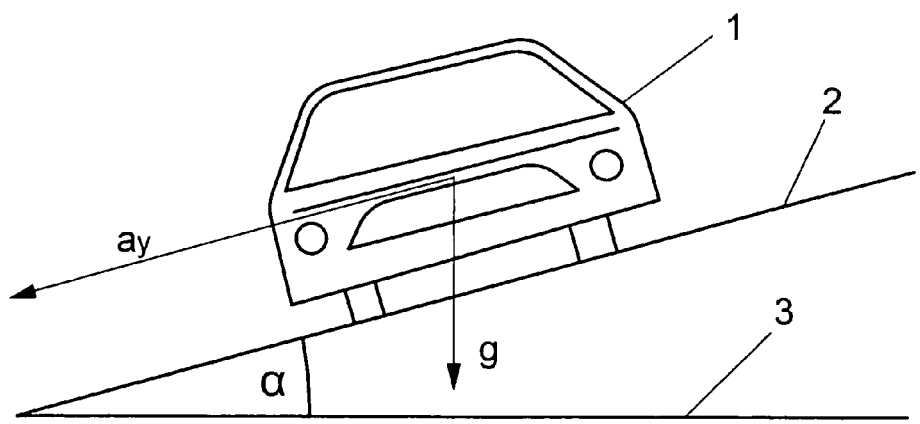
FIG. 2 is a schematic of an operating situation wherein the vehicle is shown with its longitudinal axis at right angles to the slope.
Figure 3:
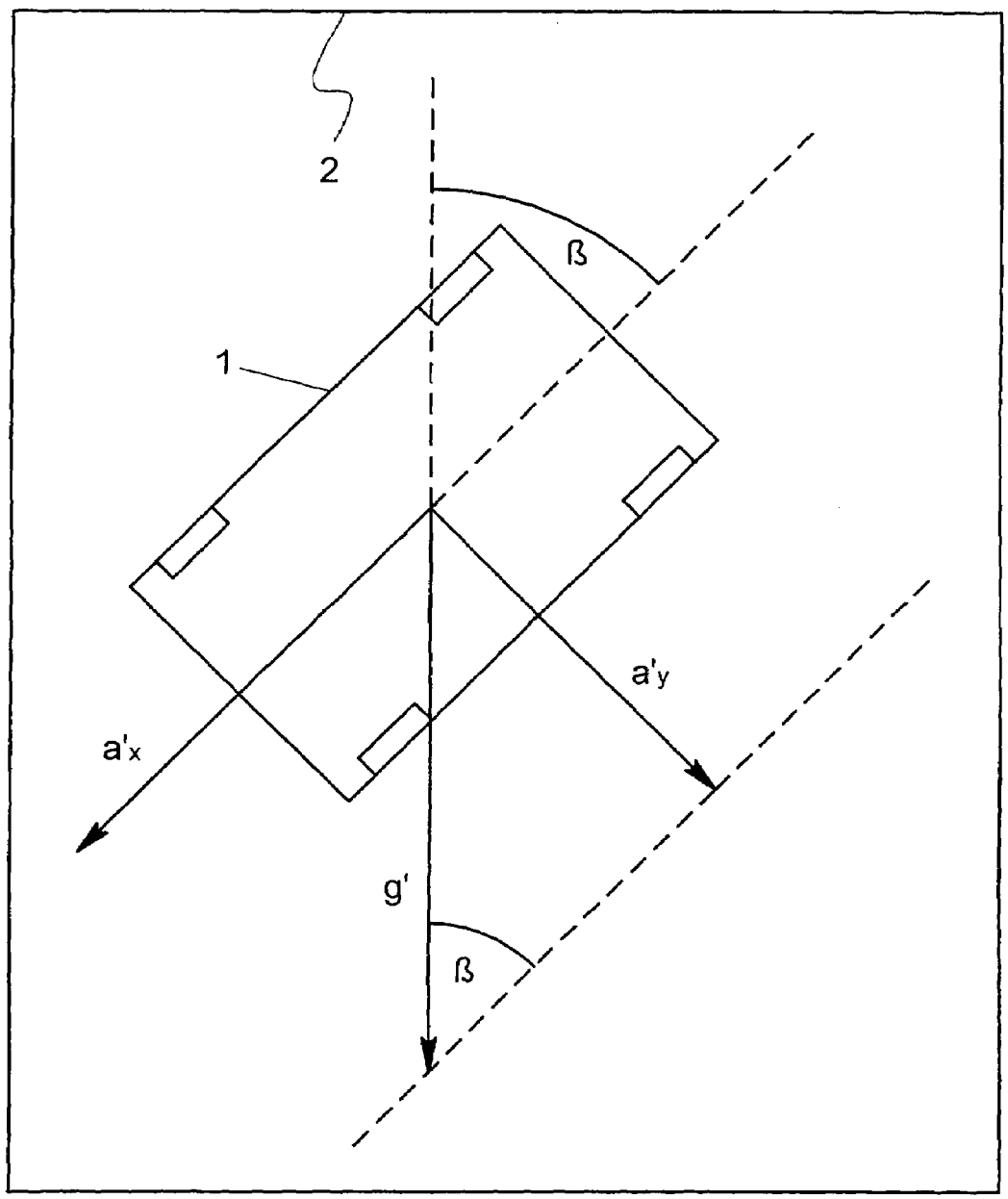
FIG. 3 is a schematic showing the motor vehicle in plan view in an operating situation wherein the longitudinal axis thereof is so aligned that this axis is disposed between the alignments shown in FIGS. 1 and 2.

FIGS. 1 to 3 show the various slope positions of a motor vehicle and show the vehicle 1 on a slope 2 which is at a slope angle α inclined with respect to the horizontal 3. In FIGS. 1 and 2, the vehicle 1 is shown in operating situations wherein the operation of a level control system is non-critical. FIG. 1 shows the vehicle 1 in a downhill direction of its longitudinal axis wherein a longitudinal acceleration ($a_x$) acts on the vehicle in a direction of the longitudinal acceleration axis and the gravitational acceleration g. The value of this longitudinal acceleration on the vehicle then amounts to $a_x = g \cdot \sin \alpha$ wherein g is a natural constant known per se.

As a rule, in this situation, the level control system does not intervene because the chassis (that is, the vehicle frame not shown here separately) maintains a permissible and predetermined distance at the forward axle as well as at the rearward axle of the vehicle 1.

FIG. 2 shows an operating situation wherein the longitudinal axis of the motor vehicle is aligned at right angles to the slope 2 so that a slope descending acceleration $a_y = g \cdot \sin \alpha$ as well as the gravitational acceleration g act upon the vehicle 1, while, for a constant driving speed or the vehicle at standstill, the value for the vehicle longitudinal acceleration is $a_x = 0$. In such operating situations, and for large slope inclination angles α, a level control system can be utilized with advantage in order to, for example, fill air springs on the slope-downwardly directed side as mentioned initially herein and, at the same time, deflate or vent the air springs on the upwardly-directed side. With this procedure, a level compensation is provided to a permissible extent in the sense that the vehicle frame or the vehicle chassis is aligned approximately in the direction to a position which is parallel to the horizontal 3.

In contrast, FIG. 3 shows the vehicle 1 in a schematic plan view III on the slope 2 in accordance with FIG. 1 in an operating situation wherein the longitudinal axis 4 of the vehicle is so aligned that this axis lies between the alignments shown in FIGS. 1 and 2. In this situation, the vehicle longitudinal axis 4 is accordingly pivoted by a slant angle β with respect to the position wherein the vehicle forward end and the vehicle rearward end are directed uphill or downhill, however, it does not lie on an elevation line of the slope 2.

For a vehicle alignment of this kind, the acceleration values $a'_x$, $a'_y$ and $g'$ act on the vehicle 1 which indicate the vector components of the acceleration values $a_x$, $a_y$ and g. Insofar as the slope inclination angle α and the slant position angle β have impermissibly large values, the actuation of a control level system can lead to the acceleration values $a'_x$ and $a'_y$ which can cause a turnover of the vehicle. This danger, which is to be avoided in any case, exists especially in vehicles having a high bodywork and with a level control system wherein the known actuators or air springs are not actuated individually for each wheel but only along a common axle of the forward wheels or rearward wheels.

The slope inclination angle α and the slant position angle β can be preferably determined by the mathematical-physical relationships referred to hereinafter.

An addition of the slope descending acceleration components results in: $a'_x + a'_y = g'$; wherein the value $g'$ is also determined by $g' = g \cdot \sin \alpha$.

With $\cos \beta = a'_x / g'$, there results: $a'_x = g' \cdot \cos \beta$. By inserting the value for $g'$, one obtains the slope descending acceleration component:

$$a'_x = \sin \alpha \cdot \cos \beta \cdot g \quad (1)$$

In the same manner, the slope descending acceleration component $a'_y$ is determined from $\sin \beta = a'_y / g'$ and $a'_y = g' \cdot \sin \beta$. By inserting the value for $g'$, one obtains the slope descending acceleration component:

$$a'_y = \sin \alpha \cdot \sin \beta \cdot g \quad (2)$$

From the combination of equations (1) and (2), the following results:

$$\frac{a'_x}{a'_y} = \frac{\cos \beta}{\sin \beta} \quad (3)$$

wherefrom:

$$\frac{a'_y}{a'_x} = \tan \beta \quad (4)$$

can be derived.

The slant position angle β can then be computed from equation (4), for example, via a series development. A slant position angle β determined in this manner can then be inserted into equation (1) so that the slope angle α can then be computed with this equation (1).

As the above derivations of angles α and β show, no separate sensor means is needed for the determination of these angles which facilitates the use of the method of the invention in the control system in an especially cost effective manner.

This control unit can be a component of a level compensating control apparatus and is so operated that the control unit draws a conclusion as to the presence of an impermissible slope and slant position, for example, when the vehicle speed value is equal to or is virtually zero and the longitudinal and transverse acceleration are greater than zero.

For a driving speed value greater than zero, the measured longitudinal acceleration value is reduced by the vehicle longitudinal acceleration value derived from the driving speed as a function of time. If, from this computing operation, a longitudinal acceleration value results, which deviates by a predetermined value from zero, this value is applied for checking the permissibility of the slope and slant positions of the vehicle.

In addition, in such an operating condition, it is determined with the aid of a steering angle signal whether the vehicle is just then driven through a curve and what the degree of curvature is. With the values of vehicle speed and steering angle, the transverse acceleration of the vehicle in a curve can be determined. A subsequent comparison to the measured transverse acceleration then indicates whether the vehicle, in combination with the determined slope position, is in an impermissible slant position.

Impermissible vehicle slope positions are preferably defined in the control apparatus as such positions for which the vehicle is disposed on a slope having a slope inclination $\alpha$ which exceeds a pregiven slope inclination limit value $\alpha_{Limit}$ and for which the vehicle assumes a slant position angle $\beta$ to this slope which exceeds a slant position limit value $\beta_{Limit}$. The slope inclination limit value $\alpha_{Limit}$ and the slant position limit value $\beta_{Limit}$ are, however, dependent upon the following: the spatial dimensions of the vehicle; its typical loading; load distribution; and, total weight of the vehicle. For a typical European middle-class vehicle, the slope inclination limit value $\alpha_{Limit}$ is greater than 20° and the slant position limit value $\beta_{Limit}$ is greater than 30°.

In a further embodiment of the method of the invention, it can be provided with advantage that, when the slope inclination limit value $\alpha_{Limit}$ and the slant position limit value $\beta_{Limit}$ are exceeded, the control apparatus advises the driver of the vehicle as to this condition and/or the slope inclination angle and slant position angle optically and/or acoustically by activating a corresponding display device and/or loudspeaker.

Furthermore, it is also a feature of the invention that the control apparatus permits a manually initiated actuation of the actuators at the wheel axle after ending the automatic level control method.

In this connection, it is advantageous according to the invention when the control apparatus recommends to the driver of the vehicle with the aid of a display or speaker system which of the affected actuators are to be actuated and in which manner these are to be actuated in accordance with the judgment of the control apparatus in order to bring the vehicle chassis into a more comfortable and/or safer spatial position notwithstanding the determined impermissible slope and slant positions. This control operation can also take place automatically along a common axis defined by the forward wheels or a common axis defined by the rearward wheels or for each wheel individually (manually or automatically triggered slope stabilization) with or without previous enablement by the driver of the vehicle.

In addition, the sensor signals, which are used for carrying out this method, should be preferably filtered in the control apparatus ahead of their further processing to avoid signal jumps so that plausible control values and data values result for the level control system as well as for the driver of the vehicle.

As already indicated, it is viewed to be especially advantageous when the method of the invention is executed in a control apparatus of an off-road vehicle or a commercial vehicle. A practical use in a passenger car is likewise possible.

Figure 4:
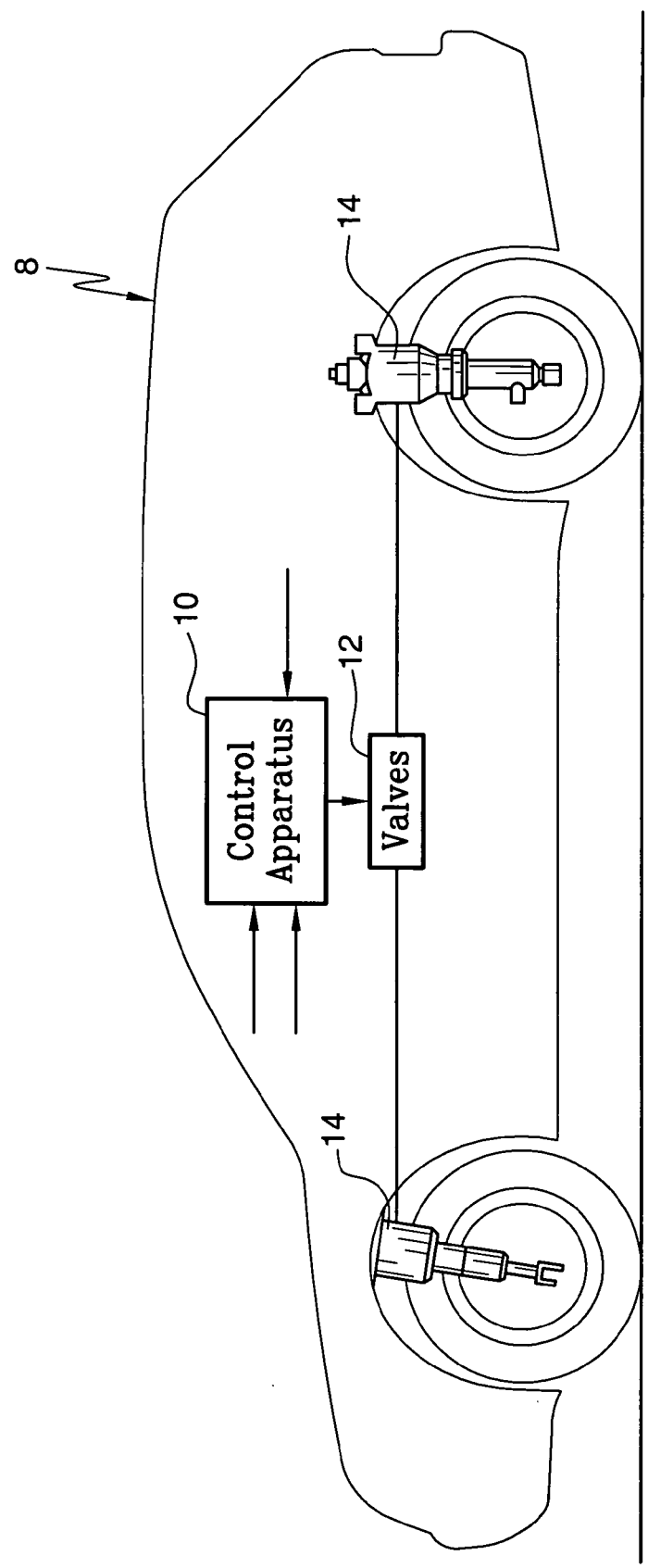
FIG. 4 is a schematic showing a level control system of the vehicle.

The method of the invention is for operating a level control system of a motor vehicle 8 as shown in FIG. 4. The system includes a control apparatus 10 and a plurality of sensors for directly or indirectly determining the distances of the vehicle chassis to the axles of the vehicle wheels to obtain measured values for these distances. These sensors are represented schematically by the signal inputs applied to the control apparatus 10, namely, the elevation signals and additional signals which include: speed, longitudinal acceleration, transverse acceleration and steering angle. These additional signals are supplied via a bus system (CAN) from other control apparatus. The desired elevation is also applied to the control apparatus 10. The control apparatus 10 outputs signals to actuators such as valves 12 for changing the distances of the vehicle chassis to the wheel axles by filling or venting air springs 14.

In the method, a check is made in control apparatus 10 as to whether these distances exceed predetermined limit values with the checking being performed by the control apparatus on the basis of the measured values in a desired-value actual-value comparison.

At least one of the actuators is actuated in response to a deviation of the distances from the limit values in order to obtain a level compensation in the sense of a horizontal alignment of the vehicle chassis. An automatic level compensating control is prevented when the motor vehicle 8 is disposed in a slope and slant position impermissible for the safety of the motor vehicle.

Figure 5:
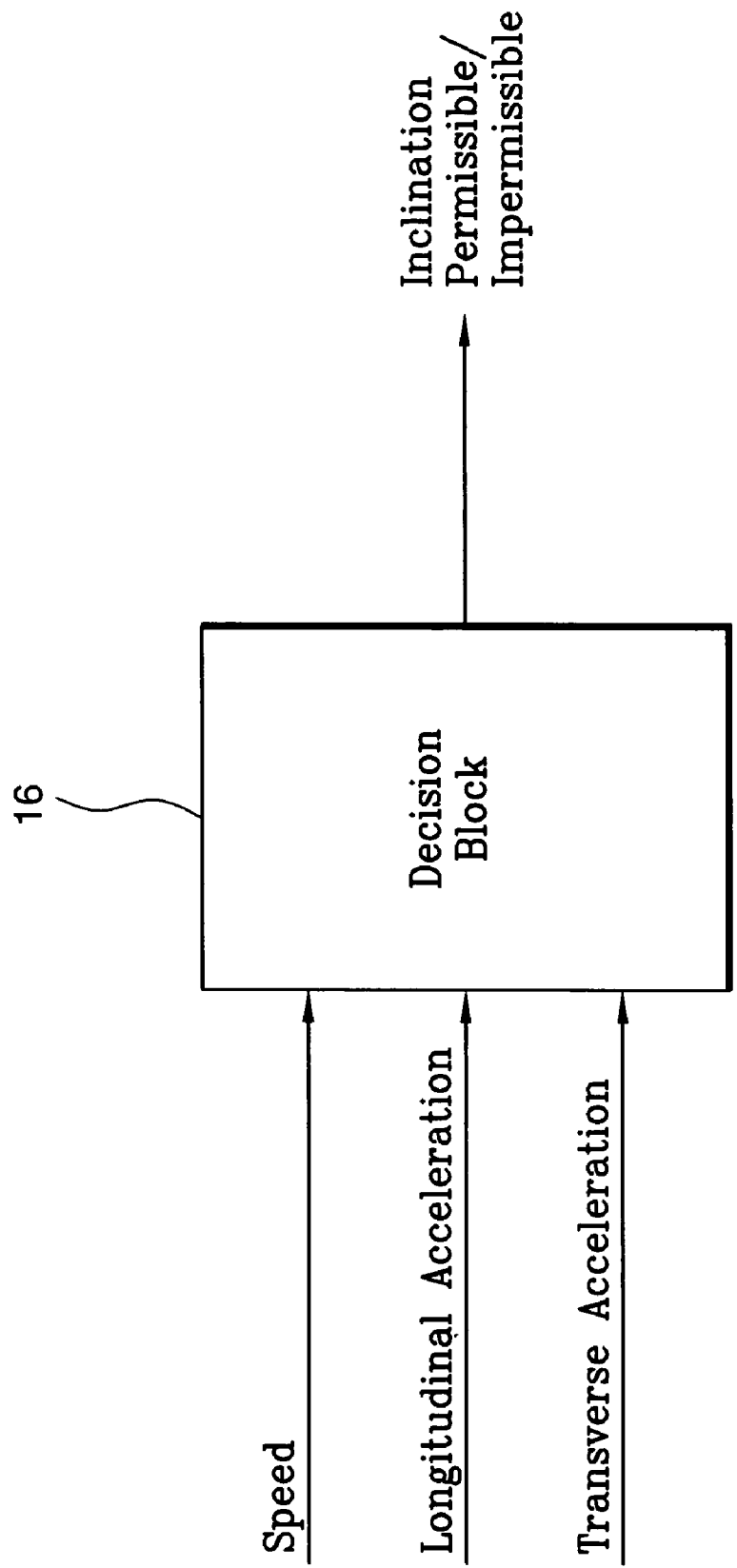
FIG. 5 is a schematic of a decision block of the control apparatus for determining when the vehicle inclination is permissible or impermissible.

The impermissible slope and slant position is determined in a decision block 16 (FIG. 5) of the control apparatus 10 from sensor data as to the speed (vehicle wheel rpm), longitudinal acceleration and transverse acceleration of the motor vehicle.

Figure 6:
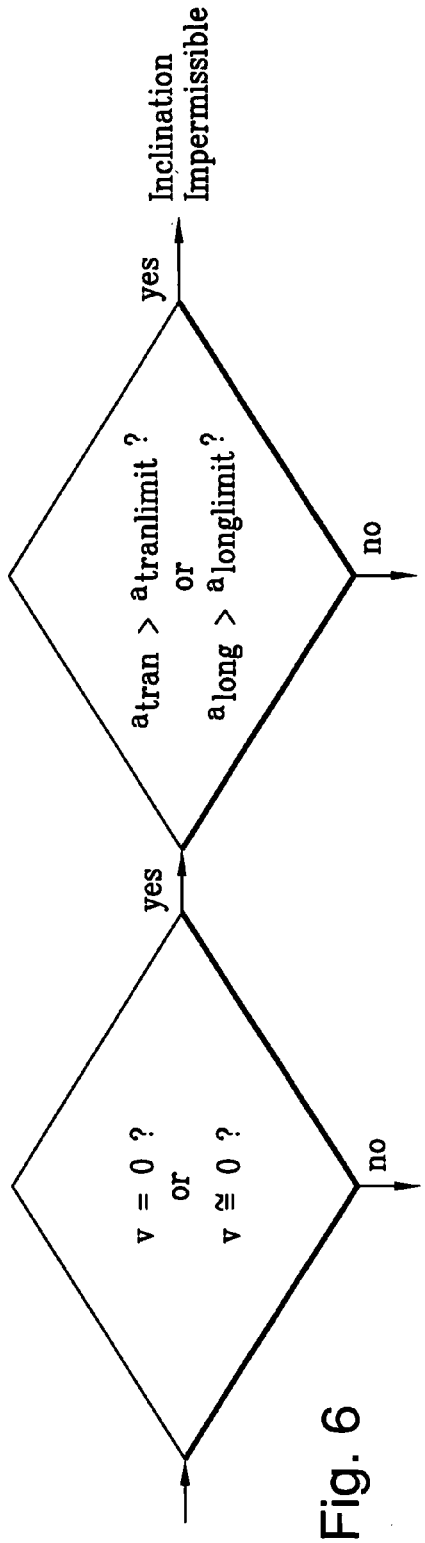
FIG. 6 shows two program steps for drawing a conclusion as to the presence of permissible slope and slant position.

A conclusion is drawn as to the presence of the impermissible slope and slant position when the vehicle speed value is equal to or close to zero and the longitudinal acceleration value and the transverse acceleration values are greater than zero. This is expressed by the program steps shown in FIG. 6 wherein: v=vehicle speed; $a_{tran}$=transverse acceleration; and, $a_{long}$=longitudinal acceleration.

Figure 7:
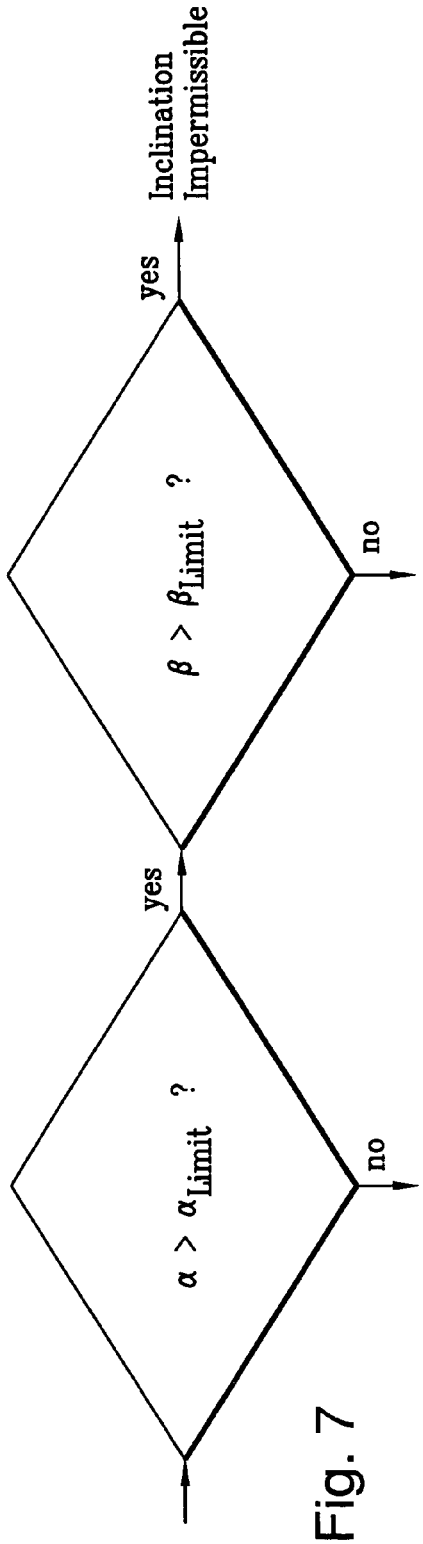
FIG. 7 is another schematic showing program steps for defining the impermissible slope and slant position.

The impermissible slope and slant position is defined as a position whereat the vehicle is on a slope having a slope inclination angle ($\alpha$) exceeding a pregiven slope inclination limit value ($\alpha_{Limit}$) and, to this slope, the vehicle assumes a slant position angle ($\beta$) which exceeds a slant position limit value ($\beta_{Limit}$) This is expressed by the program steps shown in FIG. 7.

The slope inclination limit value ($\alpha_{Limit}$) and the slant position limit value ($\beta_{Limit}$) are dependent upon: the spatial dimensions of the motor vehicle, the typical loading of the motor vehicle, the weight distribution and the total weight. Thus, the slop inclination limit value ($\alpha_{Limit}$) is equal to a function of (dimension, loading, total weight).

When the slope inclination limit value ($\alpha_{Limit}$) and the slant position limit value ($\beta_{Limit}$) are exceeded, the control apparatus 10 advises the driver of the motor vehicle of this condition and/or the values thereof optically or acoustically by activating a corresponding display device 18 and/or loudspeaker 20. This is shown in FIG. 8.

According to another feature of the invention, control apparatus 10 permits a manually triggered actuation of the actuators after an ending of the automotive level control method as shown in FIG. 9.

According to another feature of the invention, the control apparatus, with the aid of a display device or audio device, advises the driver as to which one of the affected actuators and in which manner these actuators are to be actuated in accordance with the determination of the control apparatus in order to bring the vehicle chassis into a more comfortable and/or safer spatial position notwithstanding the determined impermissible slope and slant position.

Figure 10:
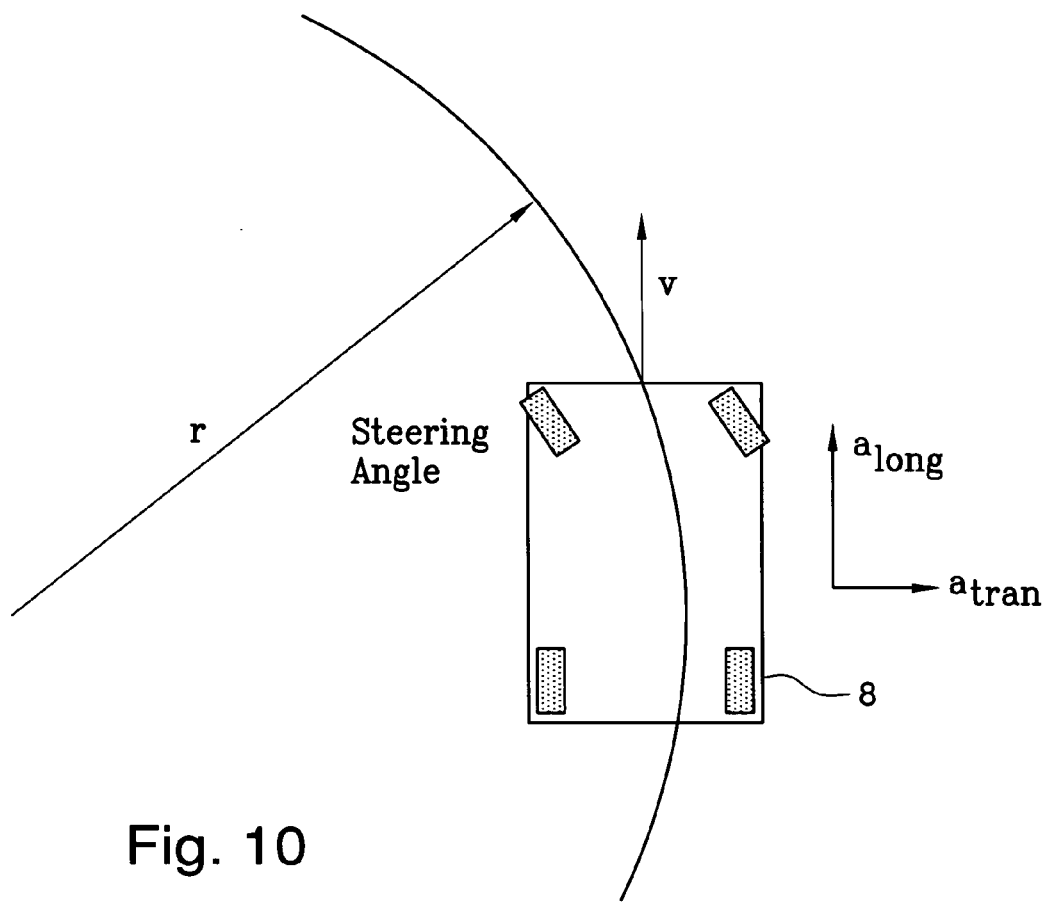
FIG. 10 is a schematic showing a vehicle traveling in a curve including the vector of the accelerations acting thereon; and, FIG. 11 is a schematic of a filter circuit for a sensor signal.

For a traveling vehicle, the instantaneous driving speed is determined and the instantaneous steering angle of the vehicle is determined utilizing a steering angle sensor. The steering angle of the vehicle 8 is shown in FIG. 10. For a drive through a curve on a slope, the influence of the transverse acceleration ($a_{tran}$) and the longitudinal acceleration ($a_{long}$) on the vehicle as a consequence of this drive through a curve is considered in the determination of the impermissible slope and slant position as well as the level compensation of this position. These accelerations are also shown in FIG. 10.

Figure 11:
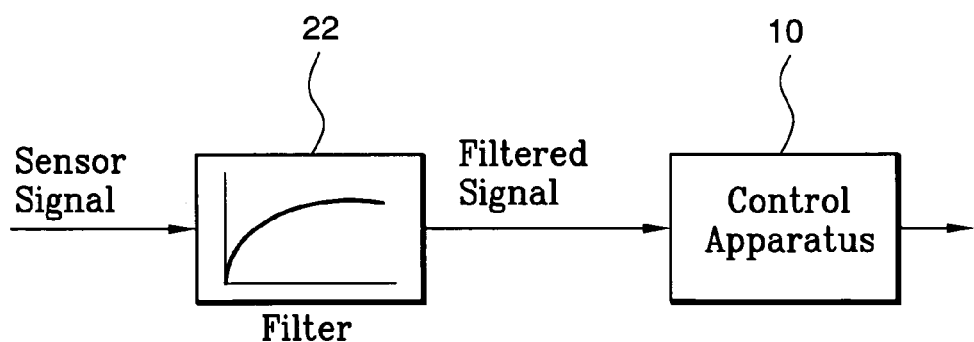

The sensor signals measured by sensors are filtered by a filter 22 as shown in FIG. 11 before further processing in the control apparatus 10 to avoid signal jumps.

It is understood that the foregoing description is that of the preferred embodiments of the invention and that various changes and modifications may be made thereto without departing from the spirit and scope of the invention as defined in the appended claims.

What is claimed is:

1. A method for operating a level control system of a motor vehicle which includes a control apparatus, a plurality of sensors for directly or indirectly determining the distances of the vehicle chassis to the axles of the vehicle wheels to obtain measured values for said distances and actuators for changing said distances, the method comprising:

checking in said control apparatus as to whether said distances exceed predetermined limit values with said checking being performed by said control apparatus on the basis of said measured values in a desired-value actual-value comparison;

determining if the vehicle is a slope and slant position impermissible for the safety of said motor vehicle from sensor data as to the speed (vehicle wheel rpm), longitudinal acceleration and transverse acceleration of said motor vehicle;

actuating at least one of said actuators in response to a deviation of said distances from said limit values in order to obtain a level compensation in the sense of a horizontal alignment of said vehicle chassis when said motor vehicle is not disposed in an impermissible slope and slant position; and, preventing an automatic level compensating control when said motor vehicle is disposed in an impermissible slope and slant position.

2. The method of claim 1, comprising the further step of drawing a conclusion as to the presence of the impermissible slope and slant position when the vehicle speed value is equal to or close to zero and the longitudinal acceleration value and the transverse acceleration values are greater than zero.

3. The method of claim 1, wherein said Impermissible slope and slant position is defined as a position whereat said vehicle is on a slope having a slope inclination angle ($\alpha$) exceeding a pregiven slope inclination limit value ($\alpha_{Limit}$) and, to this slope, said vehicle assumes a slant position angle ($\beta$) which exceeds a slant position limit value ($\beta_{Limit}$).

4. The method of claim 3, wherein said slope inclination limit value ($\alpha_{Limit}$)- and said slant position limit value ($\beta_{Limit}$) are dependent upon: the spatial dimensions of said motor vehicle, the typical loading of said motor vehicle, the weight distribution and the total weight.

5. The method of claim 4, wherein the slope inclination limit value ($\alpha_{Limit}$) is greater than 20° and the slant position limit value ($\beta_{Limit}$) is greater than 30°.

6. The method of claim 3, wherein, when said slope inclination limit value ($\alpha_{Limit}$) and said slant position limit value ($\beta_{Limit}$) are exceeded, said control apparatus advises the driver of said motor vehicle of this condition and/or the values thereof optically or acoustically by activating a corresponding display device and/or loudspeaker.

7. The method of claim 1, wherein said control apparatus permits a manually triggered actuation of said actuators after an ending of the automotive level control method.

8. The method of claim 7, wherein said control apparatus, with the aid of a display device or audio device, advises the driver as to which one of the affected actuators and in which manner these actuators are to be actuated in accordance with the determination of said control apparatus in order to bring the vehicle chassis into a more comfortable and/or safer spatial position notwithstanding the determined impermissible slope and slant position.

9. The method of claim 1, wherein, for a traveling vehicle, the instantaneous driving speed is determined arid the instantaneous steering angle of said vehicle is determined utilizing a steering angle sensor; and, wherein, for a drive through a curve on a slope, the influence of the transverse acceleration and the longitudinal acceleration on the vehicle as a consequence of this drive through a curve is considered in the determination of said impermissible slope and slant position as well as a level compensation thereof.

10. The method of claim 1, wherein sensor signals measured by at least a portion of said sensors are filtered before further processing in said control apparatus to avoid signal jumps.

11. The method of claim 1, wherein the method is carried out in a control apparatus of a passenger car, an off-road vehicle or a commercial vehicle.

* * * * *